US011302096B2

(12) United States Patent
Lohia et al.

(10) Patent No.: US 11,302,096 B2
(45) Date of Patent: Apr. 12, 2022

(54) DETERMINING MODEL-RELATED BIAS ASSOCIATED WITH TRAINING DATA

(71) Applicant: International Business Machines Corporation, Armonk, NY (US)

(72) Inventors: Pranay Kumar Lohia, Bangalore (IN);
Diptikalyan Saha, Bangalore (IN);
Manish Anand Bhide, Hyderabad (IN);
Sameep Mehta, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 139 days.

(21) Appl. No.: 16/690,738

(22) Filed: Nov. 21, 2019

(65) Prior Publication Data
US 2021/0158076 A1    May 27, 2021

(51) Int. Cl.
*G06N 20/00* (2019.01)
*G06V 10/75* (2022.01)
(Continued)

(52) U.S. Cl.
CPC .......... *G06V 10/754* (2022.01); *G06K 9/628* (2013.01); *G06K 9/6265* (2013.01);
(Continued)

(58) Field of Classification Search
CPC ........ G06N 20/00; G06N 3/0454; G06N 3/08; G06N 3/02; G06K 9/6256; G06K 9/6262;
(Continued)

(56) References Cited

U.S. PATENT DOCUMENTS

2011/0289025 A1* 11/2011 Yan .................. G06N 5/025
706/12
2015/0125072 A1   5/2015 Mitarai et al.
(Continued)

FOREIGN PATENT DOCUMENTS

EP          3101599 A2      12/2016

OTHER PUBLICATIONS

Vabalas et al., Machine learning algorithm validation with a limited sample size, Nov. 7, 2019 [retrieved Jun. 4, 2021], PLOS One, 20 pages. Retrieved: https://journals.plos.org/plosone/article?id=10.1371/journal.pone.0224365 (Year: 2019).*
(Continued)

*Primary Examiner* — Matthew C Bella
*Assistant Examiner* — Dennis Rosario
(74) *Attorney, Agent, or Firm* — Ryan, Mason & Lewis, LLP

(57) ABSTRACT

Methods, systems, and computer program products for determining model-related bias associated with training data are provided herein. A computer-implemented method includes obtaining, via execution of a first model, class designations attributed to data points used to train the first model; identifying any of the data points associated with an inaccurate class designation and/or a low-confidence class designation; training a second model using the data points from the dataset, but excluding the identified data points; determining bias related to at least a portion of those data points used to train the second model by: modifying one or more of the data points used to train the second model; executing the first model using the modified data points; and identifying a change to one or more class designations attributed to the modified data points as compared to before the modifying; and outputting identifying information pertaining to the determined bias.

19 Claims, 5 Drawing Sheets

(51) Int. Cl.
*G06K 9/62* (2022.01)
*G06N 5/04* (2006.01)

(52) U.S. Cl.
CPC .......... *G06K 9/6298* (2013.01); *G06N 5/045* (2013.01); *G06N 20/00* (2019.01)

(58) Field of Classification Search
CPC . G06T 2207/20081; G06T 2207/20084; A61B 5/7264; A61B 5/7267; G06V 10/82
See application file for complete search history.

(56) References Cited

U.S. PATENT DOCUMENTS

| | | |
|---|---|---|
| 2015/0379429 A1 | 12/2015 | Lee et al. |
| 2017/0330058 A1 | 11/2017 | Silberman et al. |
| 2019/0026345 A1 | 1/2019 | Bezzi |
| 2019/0188605 A1* | 6/2019 | Zavesky ............... G06N 20/00 |

OTHER PUBLICATIONS

Raschka, Model Evaluation, Model Selection, and Algorithm Selection in Machine Learning, Dec. 3, 2018 [retrieved Jun. 4, 2021], Cornell University, version 2, 49 pages. Retrieved: https://arxiv.org/abs/1811.12808v2 (Year: 2018).*

Guyon et al., Gene Selection for Cancer Classification using Support Vector Machines, Jan. 2002 [retrieved Jun. 4, 2021], Machine Learning, vol. 46, pp. 389-422. Retrieved: https://link.springer.com/article/10.1023/A:1012487302797 (Year: 2002).*

Nasiriani et al., Hierarchical Clustering for Discrimination Discovery: A Top-Down Approach, Jun. 2019.

Wakchaure et al., An Empirical Evaluation of various Discrimination Measures for Discrimination Prevention, Nov. 2018.

Zhang et al., "A causal framework for discovering and removing direct and indirect discrimination." arXiv preprint arXiv:1611.07509, Nov. 2016.

Priya et al., Identification of Direct and Indirect Discrimination in Data Mining, Advances in Information Science and Applications—vol. I, 2014.

Hajian et al., A methodology for direct and indirect discrimination prevention in data mining. IEEE transactions on knowledge and data engineering 25.7 (2012): 1445-1459.

SciKit-learn.org, sklearn.neighbors.KNeighborsClassifier, https://scikit-learn.org/stable/modules/generated/sklearn.neighbors.KNeighborsClassifier.html#sklearn.neighbors.KNeighborsClassifier, Jun. 12, 2019.

Srinivasan et al., "Machine learning approaches to estimating software development effort." IEEE Transactions on Software Engineering 21.2 (1995): 126-137.

* cited by examiner

DETERMINING MODEL-RELATED BIAS ASSOCIATED WITH TRAINING DATA

FIELD

The present application generally relates to information technology and, more particularly, to data management techniques.

BACKGROUND

Model providers commonly aim to create a model which does not produce any discriminatory or biased behavior. For example, existing data management approaches include attempting to identify bias-aware or discrimination-aware portions of data. However, using such approaches, challenges exist in distinguishing bias-aware portions of data from the related notion of adversarial robustness. Additionally, such approaches also face challenges with respect to generating realistic and/or plausible inputs with sufficient coverage of an input domain.

SUMMARY

In one embodiment of the present invention, techniques for determining model-related bias associated with training data are provided. An exemplary computer-implemented method can include obtaining, in connection with execution of a first model, one or more class designations attributed to data points from a dataset used to train the first model, and identifying any of the data points associated with at least one of (i) an inaccurate class designation and (ii) a class designation associated with a confidence value below a given threshold. Such a method also includes training a second model using the data points from the dataset, but excluding the identified data points, wherein the second model is related to the first model, and determining bias related to at least a portion of those data points used to train the second model. Such a determining step includes modifying one or more of the data points used to train the second model, executing the first model using the one or more modified data points, and identifying, subsequent to executing the first model, one or more instances of bias by observing a change to one or more class designations attributed to the one or more modified data points as compared to before the modifying. Further, such a method includes outputting, to at least one user, identifying information pertaining to the one or more instances of bias.

Another embodiment of the invention or elements thereof can be implemented in the form of a computer program product tangibly embodying computer readable instructions which, when implemented, cause a computer to carry out a plurality of method steps, as described herein. Furthermore, another embodiment of the invention or elements thereof can be implemented in the form of a system including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

As described herein, an embodiment of the present invention includes determining model-related bias associated with training data. At least one embodiment includes identifying bias-aware and/or sensitive regions of data points in a test input and/or test framework, and training one or more machine learning models to produce an output that represents and/or displays a record of original data points and perturbed data points. In such an embodiment, a structured input is discriminatory and/or sensitive if a perturbation of the input changes the input's (class) label. As used herein, "perturbation" refers to changing a value from an original value to a different value.

Also, such an embodiment includes selecting sample data from a set of training data as test data, whereby each item of sample data is associated with a label. The selected sample data can then be input into a machine learning model to generate an output, and the generated output test data can then be provided to a created surrogate model. In at least one embodiment, the surrogate model is created by training on the generated test data, and the surrogate model can be any type of classification model. Additionally, in one or more embodiments, clustering of training data and selecting sample data from training data can be based at least in part on misclassified and/or low-confidence data points in the model.

As further detailed herein, at least one embodiment also includes selecting one or more features and/or attributes among the selected data points, and perturbing the features and/or attributes with different values to determine if corresponding (class) labels change from the labels generated originally by the model. Additionally, such an embodiment includes performing uniform sampling within a given range, and optimizing the process of perturbation of records in the training data. As used herein, "range" refers to the range of the data associated with a given feature, while "record" refers to one or more data points.

Figure 1:
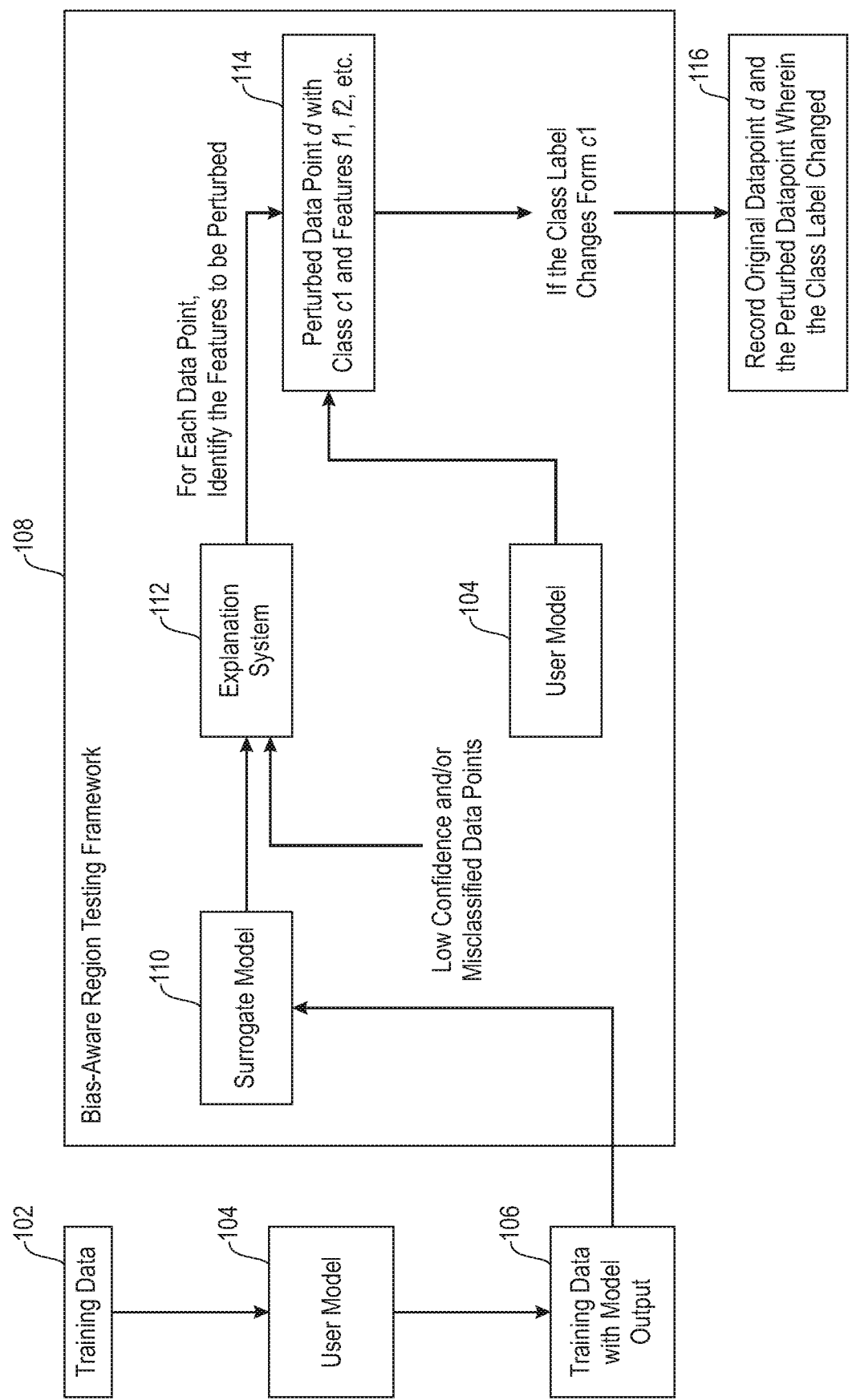
FIG. 1 is a diagram illustrating system architecture, according to an exemplary embodiment of the invention.

FIG. 1 is a diagram illustrating system architecture, according to an embodiment of the invention. By way of illustration, FIG. 1 depicts training a user model 104 with training data 102, and generating a model output 106 in the form of one or more class predictions associated with data points from the training data 102. FIG. 1 also depicts a bias-aware region testing framework 108, which includes the user model 104, a surrogate model 110, and an explanation system 112 (for example, a local interpretable model-agnostic explanation (LIME) system), and which carries out the below-described functions and/or actions.

For example, the bias-aware region testing framework 108 identifies data points, based on analysis of the training data 102 and model output 106, which are misclassified and/or associated with low-confidence classifications. In one or more embodiments, such misclassified and/or low-confidence data points are filtered out from the training data 102 and model output 106 before the training data 102 and model output 106 are used to train the surrogate model 110. Additionally, the misclassified and/or low-confidence data points are provided as partial input to the explanation system 112. By utilizing the surrogate model 110, such an embodiment includes reducing the computational resources required by the user model 104.

Additionally, for each original sample (s) from the training data 102 and model output 106 processed by the surrogate model 110, the explanation system 112 determines which K attributes and/or features are most responsible for a given classification label/decision. In one or more embodiments, the explanation system 112 implements at least one local interpretable model-agnostic explanation algorithm to carry out such determinations.

As also depicted in FIG. 1, the bias-aware region testing framework 108 generates a perturbed version 114 of at least one data point (d) processed by explanation system 112. The at least one data point (d) has a class designation (c1) and includes attributes and/or features (f1, f2, etc.). The at least one perturbed data point 114 is then processed by the user model 104, and a determination is made as to whether the class designation (c1) changes (to a different class designation). If the class designation does change, then the bias-aware region testing framework 108 generates an output 116 that includes a record of the original at least one data point (d) and the corresponding perturbed version(s) 114, as well as the class label and/or designation that changed.

One or more embodiments include implementing at least one algorithm for achieving generation effectiveness and realness. For each original data point from the training dataset, such an embodiment includes identifying and/or determining which attribute(s) and/or feature(s) is/are most responsible for a given classification decision/label. At least one example embodiment includes utilizing one or more local interpretable model-agnostic explanation algorithms to perform such determinations.

As also detailed herein, one or more embodiments include performing perturbation of one or more selected data points or features/attributes thereof. By way of example, consider a given attribute. If the attribute is categorical, at least one embodiment includes utilizing one or more other categorical values for the attribute. If the attribute is numerical, at least one embodiment includes utilizing the N closest numerical values for the attribute. Additionally, one or more embodiments also include checking and/or determining the plausibility or realness of a perturbed data point and/or attribute by consulting one or more constraints related to the perturbed data point and/or attribute.

After perturbation, at least one embodiment includes determining whether the class label attributed to the perturbed data point and/or attribute changes. If the class label changes, then the perturbed data point and/or attribute is recorded in an output (e.g., a data frame) along with the original (pre-perturbation) data point and/or attribute. Such an output can then be used to train the model to remove bias and/or sensitivity with respect to related data. In at least one embodiment, determining bias- and/or sensitivity-related regions of data include utilizing at least one decision tree related to all bias- and/or sensitivity-related samples (i.e., training data samples).

Accordingly, one or more embodiments include determining that one or more features which are discriminative and/or sensitive in a surrogate model are also discriminative and/or sensitive in an original model. Such an embodiment includes using training data to build the surrogate model and automatically test the model. In the case of multiple surrogate models, at least one embodiment includes performing a cross validation and selecting the most accurate and/or favorable surrogate model. By way of example, in one or more embodiments, a sample used in connection with at least one LIME algorithm should have the same label in the original model and in the surrogate model. Also, within the local samples that a LIME algorithm generates, at least one embodiment includes intelligently selecting K samples (near the decision boundary of the local model) and determining if the selected samples yield the same label(s) in the original model. The K samples choice can be selected, for example, based at least in part on allowable cost.

Further, in one or more embodiments, the selection of attributes from a surrogate model has no effect on the soundness of a bias and/or sensitivity analysis. Accordingly, after selecting the attributes and perturbing the selected attributes with different values, such an embodiment includes determining whether the labels change with respect to the labels associated with the original model.

At least one embodiment additionally includes implementing one or more algorithms to achieve sufficient model and/or data coverage. Such an embodiment includes selecting samples from training data as training and test data. Additionally, such an embodiment can include creating one or more arbitrary samples using data synthesis techniques satisfying the constrains related to the training data. Such a data synthesis technique can include, for example, performing uniform sampling within a given range.

Additionally, one or more embodiments include optimizing the process of perturbation of records in the training data. One such example embodiment includes clustering the training data and selecting samples near one or more of the cluster boundaries. In such an embodiment, clustering involves carrying out at least one K-means based clustering technique to group samples which are within a given proximity and/or distance to each other. Another such example embodiment includes selecting samples from training data which are misclassified and/or associated with low-confidence classifications in connection with the model.

Figure 2:
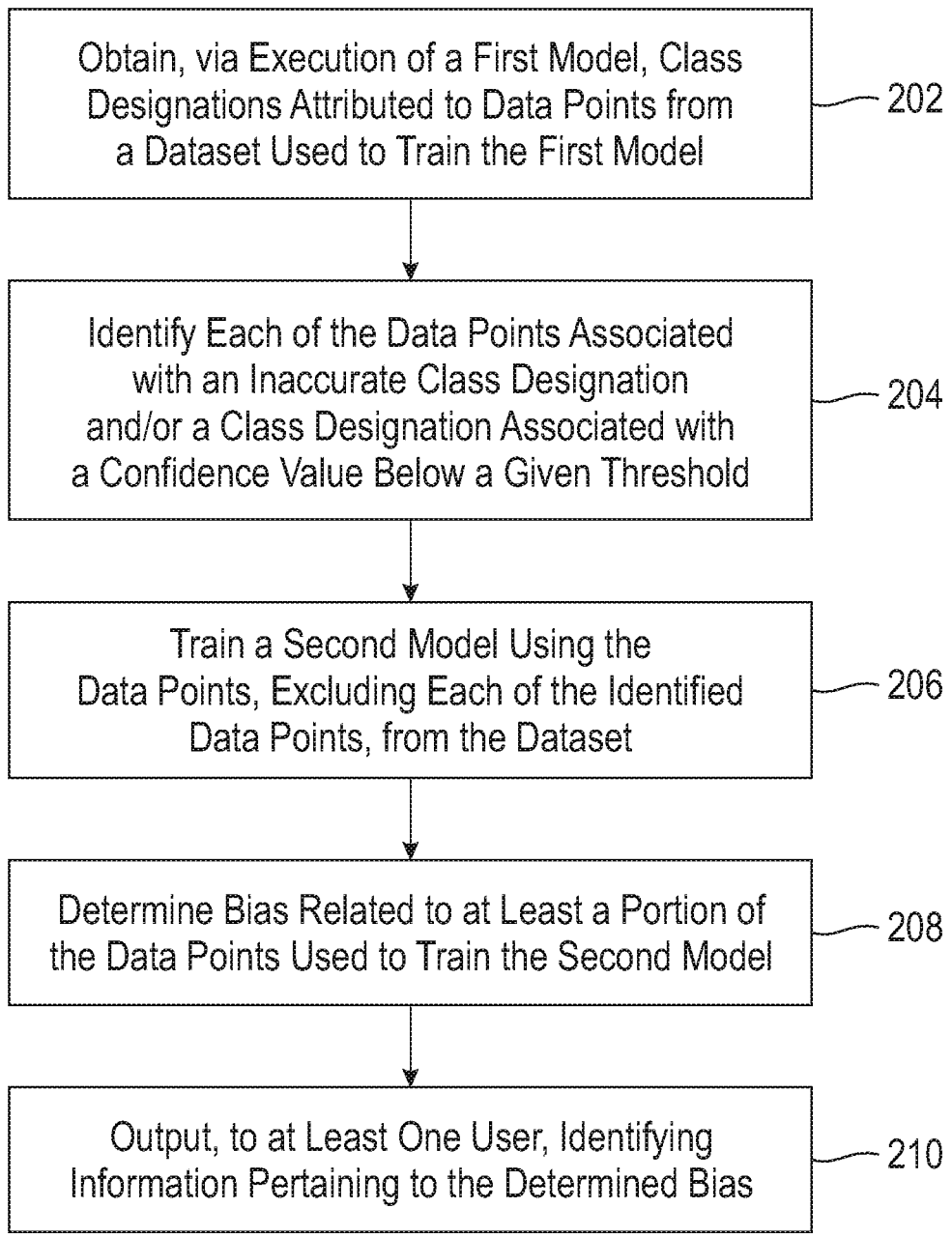
FIG. 2 is a flow diagram illustrating techniques according to an embodiment of the invention.

FIG. 2 is a flow diagram illustrating techniques according to an embodiment of the present invention. Step 202 includes obtaining, via execution of a first model, one or more class designations attributed to data points from a dataset used to train the first model. Step 204 includes identifying any of the data points associated with at least one of (i) an inaccurate class designation and (ii) a class designation associated with a confidence value below a given threshold. Step 206 includes training a second model using the data points from the dataset, but excluding each of the identified data points, wherein the second model is related to the first model.

Step 208 includes determining bias related to at least a portion of those data points used to train the second model. Determining bias includes modifying one or more of the data points used to train the second model, executing the first model using the one or more modified data points, and identifying, subsequent to said executing the first model using the one or more modified data points, one or more instances of bias by observing a change to one or more class designations attributed to the one or more modified data points as compared to before the modifying.

Also, in at least one embodiment, determining bias includes determining one or more attributes of each of the one or more data points responsible for one or more corresponding class designations. In such an embodiment, determining the one or more attributes includes utilizing at least one local interpretable model-agnostic explanation algorithm. Additionally, in one or more embodiments, modifying the one or more data points includes modifying the one or more attributes of each of the one or more data points responsible for the one or more corresponding class designations. Modifying the one or more attributes can include, for each of the one or more attributes that is a categorical attribute, substituting a first set of one or more categorical values for a second set of one or more categorical values. Also, modifying the one or more attributes can include, for each of the one or more attributes that is a numerical attribute, utilizing the N closest numerical values in lieu of one or more original numerical values attributed to the given numerical attribute.

Further, in at least one embodiment, determining bias includes determining plausibility of the one or more modified data points based at least in part on one or more constraints related to the one or more data points, and determining sufficiency of the one or more modified data points based at least in part on an input domain related to the dataset.

Step 210 includes outputting, to at least one user, identifying information pertaining to the one or more instances of bias. The techniques depicted in FIG. 2 can also include training the first model using the identifying information pertaining to the one or more instances of bias. Additionally, in one or more embodiments, each of the first model and the second model includes a machine learning model.

Further, at least one embodiment includes obtaining, in connection with execution of a first machine learning model, one or more class designations attributed to data points from a dataset used to train the first machine learning model, and identifying any of the data points associated with a class designation associated with a confidence value below a given threshold. Such an embodiment also includes training a second machine learning model using the data points from the dataset, but excluding the identified data points, and determining bias related to at least a portion of those data points used to train the second machine learning model. Such a determining step includes modifying one or more of the data points used to train the second machine learning model, executing the first machine learning model using the one or more modified data points, and identifying, subsequent to said executing the first machine learning model, one or more instances of bias by observing a change to one or more class designations attributed to the one or more modified data points as compared to before said modifying. Additionally, such an embodiment also includes outputting, to at least one user, identifying information pertaining to the one or more instances of bias, and training the first machine learning model using the identifying information pertaining to the one or more instances of bias.

The techniques depicted in FIG. 2 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 2 can be implemented via a computer program product that can include computer useable program code that is stored in a computer readable storage medium in a data processing system, and wherein the computer useable program code was downloaded over a network from a remote data processing system. Also, in an embodiment of the invention, the computer program product can include computer useable program code that is stored in a computer readable storage medium in a server data processing system, and wherein the computer useable program code is downloaded over a network to a remote data processing system for use in a computer readable storage medium with the remote system.

An embodiment of the invention or elements thereof can be implemented in the form of an apparatus including a memory and at least one processor that is coupled to the memory and configured to perform exemplary method steps.

Figure 3:
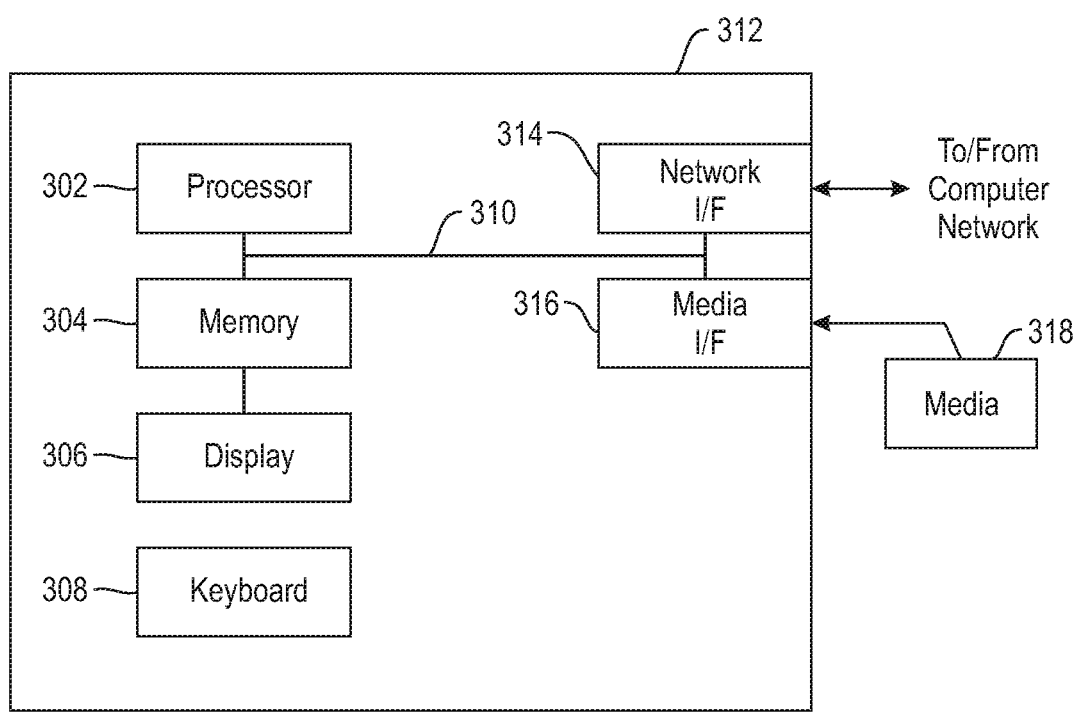
FIG. 3 is a system diagram of an exemplary computer system on which at least one embodiment of the invention can be implemented.

Additionally, an embodiment of the present invention can make use of software running on a computer or workstation. With reference to FIG. 3, such an implementation might employ, for example, a processor 302, a memory 304, and an input/output interface formed, for example, by a display 306 and a keyboard 308. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 302, memory 304, and input/output interface such as display 306 and keyboard 308 can be interconnected, for example, via bus 310 as part of a data processing unit 312. Suitable interconnections, for example via bus 310, can also be provided to a network interface 314, such as a network card, which can be provided to interface with a computer network, and to a media interface 316, such as a diskette or CD-ROM drive, which can be provided to interface with media 318.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 302 coupled directly or indirectly to memory elements 304 through a system bus 310. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 308, displays 306, pointing devices, and the like) can be coupled to the system either directly (such as via bus 310) or through intervening I/O controllers (omitted for clarity).

Network adapters such as network interface 314 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 312 as shown in FIG. 3) running a server program. It will be understood that such a physical server may or may not include a display and keyboard.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 302. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings of the invention provided herein, one of ordinary skill in the related art will be able to contemplate other implementations of the components of the invention.

Additionally, it is understood in advance that implementation of the teachings recited herein are not limited to a particular computing environment. Rather, embodiments of the present invention are capable of being implemented in conjunction with any type of computing environment now known or later developed.

For example, cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
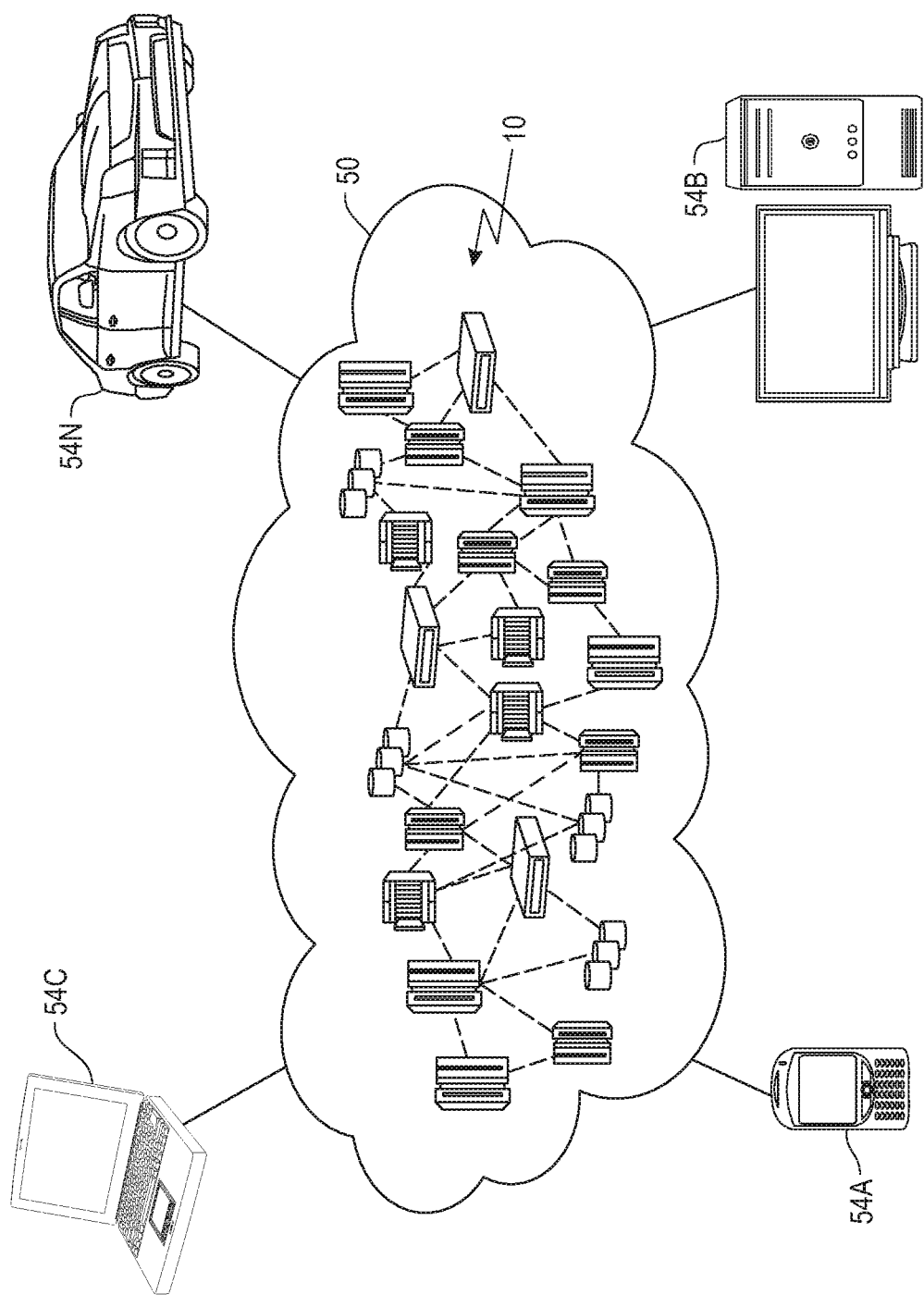
FIG. 4 depicts a cloud computing environment according to an embodiment of the present invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
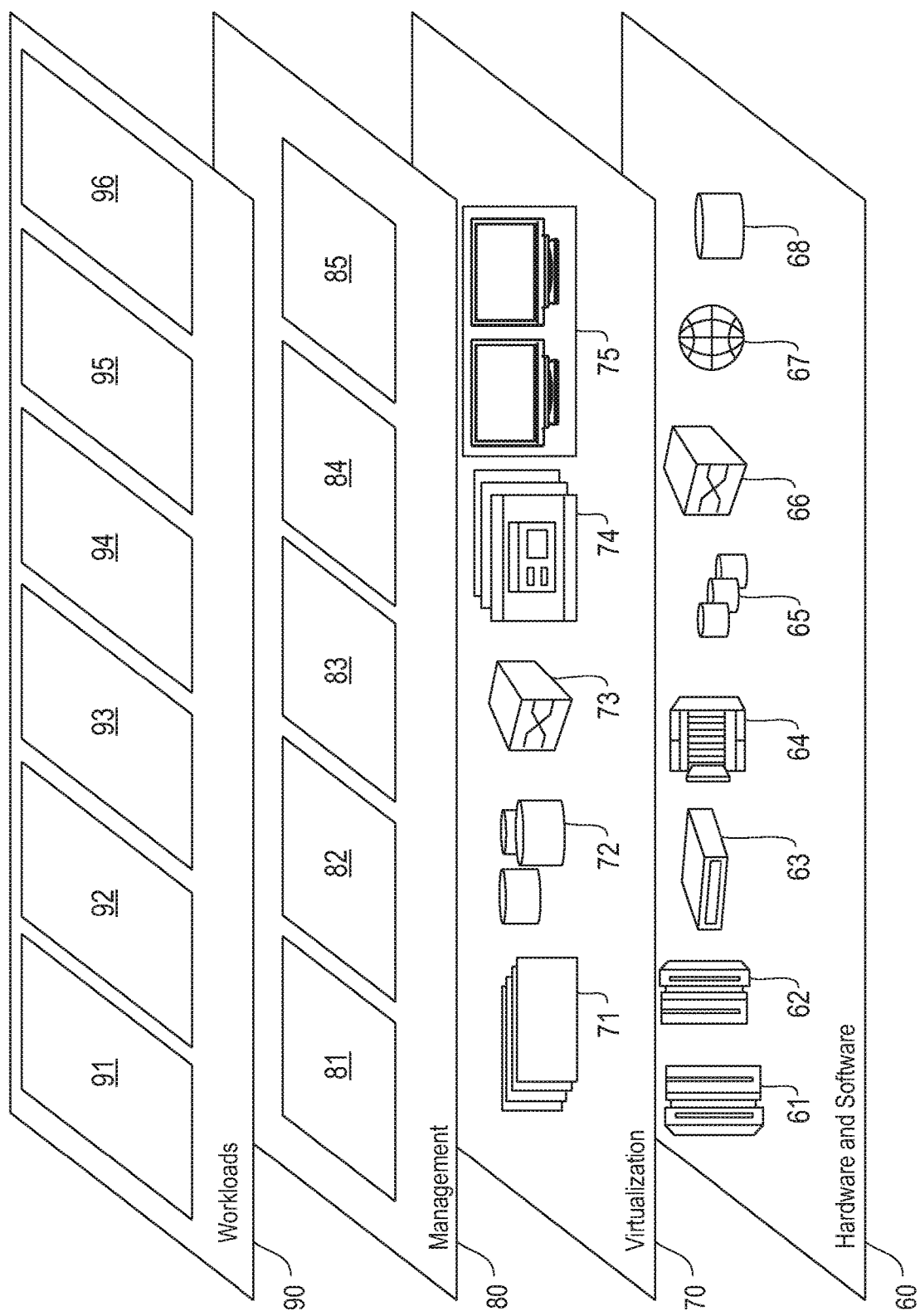
FIG. 5 depicts abstraction model layers according to an embodiment of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources.

In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and model-related bias determination 96, in accordance with the one or more embodiments of the present invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one embodiment of the present invention may provide a beneficial effect such as, for example, performing uniform sampling within a given range and optimizing the process of perturbation of records in a set of training data.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
obtaining, in connection with execution of a trained first model, one or more class designations attributed to data points from a dataset used to train the first model;
identifying, based at least in part on analyzing (a) the dataset, (b) the one or more class designations, and (c) one or more outputs of the first model, any of the data points associated with at least one of (i) an inaccurate class designation and (ii) a class designation associated with a confidence value below a given threshold;
generating an updated version of the dataset by filtering out, from the dataset and from the one or more outputs of the first model, the data points identified with at least one of (i) an inaccurate class designation and (ii) a class designation associated with a confidence value below the given threshold;
training a second model using (i) the data points from the updated version of the dataset and (ii) the one or more outputs of the first model remaining subsequent to said filtering out of the identified data points, wherein the second model is related to the first model;
determining, for one or more portions of the data points from the updated version of the dataset and the one or more filtered outputs of the first model, one or more data features contributing to at least one class designation, wherein said determining the one or more data features comprises using at least one local interpretable model-agnostic explanation algorithm;
determining bias related to at least a portion of those data points used to train the second model, wherein said determining comprises:

modifying one or more of the data points used to train the second model based at least in part on the one or more determined data features;

executing the first model using the one or more modified data points; and identifying, subsequent to said executing the first model, one or more instances of bias by observing a change to one or more class designations attributed to the one or more modified data points as compared to before said modifying; and outputting, to at least one user, identifying information pertaining to the one or more instances of bias;

wherein the method is carried out by at least one computing device.

2. The computer-implemented method of claim 1, comprising:

training the first model using the identifying information pertaining to the one or more instances of bias.

3. The computer-implemented method of claim 1, wherein said determining bias comprises determining one or more attributes of each of the one or more data points responsible for one or more corresponding class designations.

4. The computer-implemented method of claim 3, wherein said determining the one or more attributes comprises utilizing at least one local interpretable model-agnostic explanation algorithm.

5. The computer-implemented method of claim 3, wherein said modifying the one or more data points comprises modifying the one or more attributes of each of the one or more data points responsible for the one or more corresponding class designations.

6. The computer-implemented method of claim 5, wherein said modifying the one or more attributes comprises, for each of the one or more attributes that is a categorical attribute, substituting a first set of one or more categorical values for a second set of one or more categorical values.

7. The computer-implemented method of claim 5, wherein said modifying the one or more attributes comprises, for each of the one or more attributes that is a numerical attribute, utilizing a given number of closest numerical values in lieu of one or more original numerical values attributed to the numerical attribute.

8. The computer-implemented method of claim 1, wherein said determining bias comprises determining plausibility of the one or more modified data points based at least in part on one or more constraints related to the one or more data points.

9. The computer-implemented method of claim 1, wherein said determining bias comprises determining sufficiency of the one or more modified data points based at least in part on an input domain related to the dataset.

10. The computer-implemented method of claim 1, wherein each of the first model and the second model comprises a machine learning model.

11. A computer program product comprising a non-transitory computer readable storage medium having program instructions embodied therewith, the program instructions executable by a computing device to cause the computing device to:

obtain, in connection with execution of a trained first model, one or more class designations attributed to data points from a dataset used to train the first model;

identify, based at least in part on analyzing (a) the dataset, (b) the one or more class designations, and (c) one or more outputs of the first model, any of the data points associated with at least one of (i) an inaccurate class designation and (ii) a class designation associated with a confidence value below a given threshold;

generate an updated version of the dataset by filtering out, from the dataset and from the one or more outputs of the first model, the data points identified with at least one of (i) an inaccurate class designation and (ii) a class designation associated with a confidence value below the given threshold;

train a second model using (i) the data points from the updated version of the dataset and (ii) the one or more outputs of the first model remaining subsequent to said filtering out of the identified data points, wherein the second model is related to the first model;

determine, for one or more portions of the data points from the updated version of the dataset and the one or more filtered outputs of the first model, one or more data features contributing to at least one class designation, wherein said determining the one or more data features comprises using at least one local interpretable model-agnostic explanation algorithm;

determine bias related to at least a portion of those data points used to train the second model, wherein said determining comprises:

modifying one or more of the data points used to train the second model based at least in part on the one or more determined data features;

executing the first model using the one or more modified data points; and identifying, subsequent to said executing the first model, one or more instances of bias by observing a change to one or more class designations attributed to the one or more modified data points as compared to before said modifying; and output, to at least one user, identifying information pertaining to the one or more instances of bias.

12. The computer program product of claim 11, wherein the program instructions executable by a computing device further cause the computing device to:

train the first model using the identifying information pertaining to the one or more instances of bias.

13. The computer program product of claim 11, wherein said determining bias comprises determining one or more attributes of each of the one or more data points responsible for one or more corresponding class designations.

14. The computer program product of claim 13, wherein said determining the one or more attributes comprises utilizing at least one local interpretable model-agnostic explanation algorithm.

15. The computer program product of claim 11, wherein said determining bias comprises determining plausibility of the one or more modified data points based at least in part on one or more constraints related to the one or more data points.

16. A system comprising:

a memory; and at least one processor operably coupled to the memory and embodying at least one program configured for:

obtaining, in connection with execution of a trained first model, one or more class designations attributed to data points from a dataset used to train the first model;

identifying, based at least in part on analyzing (a) the dataset, (b) the one or more class designations, and (c) one or more outputs of the first model, any of the data points associated with at least one of (i) an inaccurate class designation and (ii) a class designation associated with a confidence value below a given threshold;
generating an updated version of the dataset by filtering out, from the dataset and from the one or more outputs of the first model, the data points identified with at least one of (i) an inaccurate class designation and (ii) a class designation associated with a confidence value below the given threshold;
training a second model using the data points from the updated version of the dataset and (ii) the one or more outputs of the first model remaining subsequent to said filtering out of the identified data points, wherein the second model is related to the first model;
determining, for one or more portions of the data points from the updated version of the dataset and the one or more filtered outputs of the first model, one or more data features contributing to at least one class designation, wherein said determining the one or more data features comprises using at least one local interpretable model-agnostic explanation algorithm;
determining bias related to at least a portion of those data points used to train the second model, wherein said determining comprises:
modifying one or more of the data points used to train the second model based at least in part on the one or more determined data features;
executing the first model using the one or more modified data points; and
identifying, subsequent to said executing the first model, one or more instances of bias by observing a change to one or more class designations attributed to the one or more modified data points as compared to before said modifying; and
outputting, to at least one user, identifying information pertaining to the one or more instances of bias.

17. The system of claim 16, wherein the at least one program is further configured for:
training the first model using the identifying information pertaining to the one or more instances of bias.

18. The system of claim 16, wherein said determining bias comprises determining one or more attributes of each of the one or more data points responsible for one or more corresponding class designations.

19. The system of claim 18, wherein said determining the one or more attributes comprises utilizing at least one local interpretable model-agnostic explanation algorithm.

* * * * *